(12) United States Patent
Handman

(10) Patent No.: US 7,508,530 B1
(45) Date of Patent: Mar. 24, 2009

(54) MULTI-POINT POSITION MEASURING AND RECORDING SYSTEM FOR ANTHROPOMORPHIC TEST DEVICES

(75) Inventor: Daniel F. Handman, Boxboro, MA (US)

(73) Assignee: Boxboro Systems, LLC, Newton, MA (US)

( * ) Notice: Subject to any disclaimer, the term of this patent is extended or adjusted under 35 U.S.C. 154(b) by 15 days.

(21) Appl. No.: 11/715,669

(22) Filed: Mar. 8, 2007

(51) Int. Cl.
  *G01B 5/30* (2006.01)
  *G01B 11/14* (2006.01)
(52) U.S. Cl. .......................... 356/614; 73/760; 356/624
(58) Field of Classification Search .............. 356/139.1, 356/140–141, 153–154, 400; 73/800, 866.4; 434/267–275
See application file for complete search history.

(56) References Cited

U.S. PATENT DOCUMENTS

| | | | | |
|---|---|---|---|---|
| 3,513,687 | A * | 5/1970 | King et al. | 73/12.01 |
| 4,691,556 | A * | 9/1987 | Mellander et al. | 73/12.01 |
| 5,162,643 | A * | 11/1992 | Currie | 250/206.1 |
| 6,575,757 | B1 | 6/2003 | Leight et al. | 434/273 |
| 6,982,409 | B2 * | 1/2006 | Huang et al. | 250/221 |
| 7,359,041 | B2 * | 4/2008 | Xie et al. | 356/141.1 |
| 2003/0083844 | A1* | 5/2003 | Reddi et al. | 702/150 |
| 2007/0058163 | A1 | 3/2007 | Handman | |

FOREIGN PATENT DOCUMENTS

JP  3135765  12/2000

OTHER PUBLICATIONS

Procedures for Assembly, Disassembly, and Inspection (PADI) of the Hybrid III 5th Percentile Adult Female Crash Test Dummy (HIII-5F0), Alpha Version revised Jun. 2002, National Highway Traffic Safety Administration (NHTSA reference), Appendix B, Part 572, Subpart O.
THOR Advanced Crash Test Dummy (50th Percentile Adult Male, Alpha Version), [online] [retrieved on Oct. 24, 2006], retrieved from: http://www-nrd.nhtsa.dot.gov/departments/nrd-51/THORAdv/THORAdv.htm.
THOR Advanced Crash Test Dummy User's Manual of the 50th Percentile Male (Alpha Version 1.1 released Dec. 14, 2001, National Highway Traffic Safety Administration reference), Oct. 30, 2001; [online], retrieved from: http://www-nrd.nhtsa.dot.gov/departments/nrd-51/THORAdv/ThorAdv_manualNDX.html.
Ogata, K., et al., "Development of a Sternum Displacement Sensing System for Hybrid III Dummy," *13th International Technical Conference on Experimental Safety Vehicles*,947-956 (1991).

* cited by examiner

*Primary Examiner*—L. G Lauchman
*Assistant Examiner*—Jarreas C Underwood
(74) *Attorney, Agent, or Firm*—Hamilton, Brook, Smith & Reynolds, P.C.

(57) ABSTRACT

The motion of an Anthropomorphic Test Device (ATD) member is measured. For example, the motion of ribs and other components of an ATD or Crash-Test Dummy are tracked during crash testing and dummy calibration using light angle detectors and triangulation techniques.

33 Claims, 15 Drawing Sheets

MULTI-POINT POSITION MEASURING AND RECORDING SYSTEM FOR ANTHROPOMORPHIC TEST DEVICES

BACKGROUND OF THE INVENTION

In general, car manufacturers have three different reasons to perform crash tests: (1) meeting US and European regulations in order to get the official approval and homologation for road service in the various countries; (2) meeting the requirements of various consumer tests such as EuroNCAP, US-NCAP, JNCAP etc.; and (3) research and development tests that give the design engineers valuable inputs to create safer cars. The National Highway Traffic Safety Administration (NHTSA) has a legislative mandate under Title 49 of the United States Code, Chapter 301, Motor Vehicle Standard, to issue Federal Motor Vehicle Safety Standards (FMVSS) and Regulations to which manufacturers of motor vehicles and items of motor vehicle equipment must conform and certify compliance. Part 572 defines the Anthropomorphic Test Devices.

Included in these regulations are definitions for the Hybrid III $50^{th}$ male, 5th female, 3-month-old, 9-month-old, 6-year-old, and 9-year-old frontal impact dummies, and a $50^{th}$ male side impact dummy. Several new frontal and side impact dummies are currently being reviewed world-wide for inclusion in enhanced safety standards. FMVSS 208 and 209 define testing methods for frontal impact tests, and FMVSS 214 defines methods for side impact crash tests. Similar standards exist throughout the world.

See Procedures for Assembly, Disassembly, and Inspection (PADI) of the Hybrid III $5^{th}$ Percentile Adult Female Crash Test Dummy (HIII-5F0, Alpha Version revised June 2002, National Highway Traffic Safety Administration (NHTSA reference), which is incorporated by reference in its entirety.

The regulations also define standards for impact protection based on a variety of force, acceleration, and displacement measurements taken on the dummies during a crash. Of particular importance is measurement of the deformation of the ribs of crash test dummies. FIG. 13 shows a side view of a Hybrid III $5^{th}$ female ATD, and FIGS. 14A and 14B show front and side views of the chest of the Hybrid III $5^{th}$ female, all taken from the Hybrid III NHTSA reference. The construction of this dummy is representative of the Hybrid III series.

The Hybrid III $5^{th}$ female ATD comprises a head assembly 1201, a neck assembly 1203, an upper neck bracket 1205, a lower neck bracket 1207, an upper rib guide 1209, an upper torso assembly 1211, a lower rib guide 1213, a lower torso assembly 1215, and a leg assembly 1217. FIGS. 14A and 14B provide a closer view of upper torso assembly 1211, which is where measurements of the deformation of the ribs are performed. Torso assembly 1211 comprises a rib set 1301 held in place with the use of behind rib straps 1303 and stiffener strip 1305, all contained within bib assembly 1307.

Currently, a potentiometer and linkage 1315 is used to measure the compression of the sternum 1311 towards the spine, or sternum stop 1309, at a single point in the middle of the sternum. Chest transducer assembly 1313 receives data from the potentiometer and linkage assembly 1315 and aids in the computation of chest deflection. One end of the linkage has a ball that rides in a track on the front of the sternum. Under severe impacts the ball disconnects from the track, invalidating the data collected. Automotive safety experts wish to get motion data from multiple points on the chest, and to extend the measurements from a single axis to two or three axes.

Alternatives to the chest potentiometer have been built and are currently being evaluated, including the "Thumper" which measures compression at 4 points on the chest, and a multipoint linkage system that measures three degrees of freedom at 4 points on the chest, such as the THOR Advanced Crash Test Dummy. They have not been incorporated into regulations at this time.

See THOR Advanced Crash Test Dummy User's Manual of the 50th Percentile Male (Alpha Version 1.1 released Dec. 14, 2001, National Highway Traffic Safety Administration reference), which is incorporated by reference in its entirety.

FIG. 1 shows a side view of a THOR (Test Device for Human Occupant Restraint) Alpha $50^{th}$ male version ATD, taken from the THOR Advanced Crash Test Dummy NHTSA reference. The ATD 100 comprises an instrumented head and face 101, a neck assembly 103, shoulder assembly 107, neck pitch change mechanism 109, adjustable posture spine assembly 111, pelvic assembly 113, femur assembly 115, instrumented abdominal assembles 119, and lower leg assembly 121. ATD 100 provides an estimate of bodily harm or deformation of the rib area of a human male with the use of elliptical ribs 105 and a four point chest deflection instrumentation 117.

A more detailed view of the elliptical ribs 105 and four point chest deflection instrumentation 117, may be seen in FIGS. 2A and 2B, taken from the THOR Advanced Crash Test Dummy NHTSA reference. Torso 117 comprises a rib assembly with rib stiffeners 201, a thoracic spine load cell 203, upper compact rotary units (CRUX) 205, lower CRUX units 207, a triaxial accelerometer 209, a sternal plate comprising a uniaxial accelerometer 211, an upper sternum 213, and a protective bib covering 215.

The triaxial accelerometer 209 is located in the center of gravity of torso 117 and is used to measure acceleration along three principle axes. The uniaxial accelerometer 211 is positioned on the sternal plate is and is used to measure acceleration at that point.

The upper and lower CRUX units, 205 and 207 respectively, measure the deflection of the rib cage and capture three dimension deformation data. The CRUX units comprise a two bar linkage system which features three measured degrees of freedom to provide a three-dimensional measurement. The CRUX unit comprises an end joint 224 with rotary capability, a mid joint 226 and a base joint 228. The mid joint 226 and base joint 228 further comprise precision rotary potentiometers 230 to measure the position of the various link-arms. A single potentiometer is mounted at the mid-joint and two potentiometers are mounted at the base joint. The CRUX unit is attached to the sternum bib through a bib attachment 222.

During impact testing, the output voltages from each of the three potentiometers are recorded with data acquisition systems. This data is processed to convert the output voltages into three-dimensional coordinates for X, Y, and Z displacement. Therefore the initial, dynamic and final positions of the unit may be determined directly from the potentiometer output voltage signals.

A tube lighting technique has also been developed where light emitting diodes and sensors are placed on opposite sides of an ATD rib connected by a telescoping tube. The telescoping tube will contract once the ribs are comprised. The light measured by the sensors will be increased in intensity once the ribs are comprised. A measurement of rib deformation may be achieved by measuring the intensity changes of the light.

SUMMARY OF THE INVENTION

Due to the mass of the parts and friction in the assemblies, the measurement systems mentioned above affect the bio-fidelity, the measure of how well the ATD simulates a human being, of the chest assembly. All of the above mentioned ATD methods require mechanical connections between the measurement point and a reference point, thus reducing bio-fidelity as well as limiting the number of possible measurement points. Non-contact solutions are preferred in order to substantially increase the number of potential measurement points without affecting the bio-fidelity of the crash test dummy, without adding uncertainty to the measurements or decreasing the sampling rate of the measurement.

At least two non-contact optical systems for measuring displacements within the thorax of an ATD have been proposed. Both systems use optical angle sensors mounted to the ATD spine that track the positions of multiple light emitting diodes (LEDs) mounted on the ribs and sternum of the ATD, by means of triangulation.

In the one of the non-contact optical systems, Reddi, Oslon, and Savage, in US Patent Application Publication US2003/0083844 A1, describe the application of multiple optical angle sensors to calculate the positions of multiple LEDs inside the thorax of a crash test dummy. Reddi et al. propose using linear arrays of photosensitive elements, preferably CCDs, as light angle sensors. The device of Reddi et al. turns on all of the LEDs at the same time and uses a target tracking/estimating approach to determine the positions of the LEDs. The use of target tracking and position estimating algorithms adds uncertainty to the position measurement accuracy.

In another non-contact optical system, Ogata, Chiba, Kawai and Asakura, in a paper presented at the 1991 ESV conference, "Development of a Sternum Displacement Sensing System for a Hybrid III Dummy;" and in Japanese Patent 3135765, describe using position sensitive diodes (PSD) based optical cameras to monitor the positions of multiple LEDs inside the thorax of a crash test dummy. Ogata et al. uses time multiplexed LEDs in their system, and drive the LEDs with an AC signal to eliminate ambient light effects. Ogata et al. also describes the use of mirrors to effectively increase the distance from the LEDs to the PSD cameras. Ogata et al. additionally describes the use of calibration tables to overcome the non-linearities of the system.

The use of triangulation to measure the position of a light source, using multiple optical angle sensors, is a well known technique. The difficulties in applying this technology to measure rib motions inside the thorax of a crash test dummy lie in the large variations in light intensity at a sensor due to motions of the LED within the measurement range. The intensity variations are due to two factors: (1) the light intensity at a sensor due to light emitted from a source is inversely proportional to the square of the distance between the light sensor and the light source; and (2) the light intensity emitted from a LED decreases as the viewing angle of the light with respect to the face of the LED increases. The affects of the second factor is shown in FIG. 15, which displays an emission pattern of an Osram Golden Dragon series LED.

During a crash test, a LED mounted on a rib can move from its undeflected position of approximately four inches from a sensor mounted to the spine, to closer than 1.5 inches from a sensor. Due to the flexibility of the ribs, the angular orientation of the LED can also change significantly. Both the Reddi and Ogata devices turn on the LEDs at a constant drive level, and therefore a constant brightness.

FIG. 16 provides an example by displaying two sensor heads; the left sensor 71 and the right sensor 72 spaced 5 inches apart as they would be if they were mounted to a spine of a $5^{th}$ female Hybrid III dummy. Led A 73 is shown 1.5 inches and directly in line with the left sensor 71. LED B 74 is shown 4 inches directly in line with the right sensor 72. The locations of both LEDs are within the desired measurement range. If the LED drive is adjusted for a maximum reading from the sensor when the LED is closest to a sensor, as LED A is shown in FIG. 16, then by using the inverse square law, and the LED intensity versus viewing angle curve (FIG. 15), the light intensity at each sensor head (in a percent of a maximum) for both the left and right sensor heads for LEDs at the positions shown (FIG. 16) may be calculated.

| LED | Intensity at Left Sensor | Intensity at Right Sensor |
|---|---|---|
| A | 100% | 2.5% |
| B | 3.5% | 14% |

As seen from the table above, with constant LED brightness the sensors will see very low light intensities for LEDs in various positions within the measurement range. The low light intensities will result in a small signal to noise ratio, and large measurement errors. Reddi attempts to solve this problem using CCD sensors with a large dynamic range, and rely on peak locations for measurement data. Ogata utilizes mirrors in order to minimize the LED to sensor distance variations as a LED traverses the measurement range. Ogata also drives the LEDs with an AC signal, and uses AC coupling between the PSD and an PSD transimpedance amplifier in order to eliminate the effects of ambient light and PSD dark current. However, the use of this technique means that each LED must be turned on for at least several cycles of the AC drive AC period, minimizing the number of LEDs that can be multiplexed on and off in a given data sampling period.

An ATD, and method for providing an ATD, comprising a light emitter, the light emitter being mounted on an ATD member, and plural incident light detectors that receive light from the light emitter, is described. It should be appreciated that angle light detectors may be used as incident light detectors. The ATD measurement system will be described using a rib as an example of an ATD member. It should be appreciated that other components of the ATD may be measured for deformation, for example a sternum. Preferably, no mechanical connections exist between the light emitter and the plural incident light angle detectors other than through the ATD member, thus increasing the bio-fidelity of the ATD.

Data may be collected from the incident light angle detectors and may provide a measurement of ATD member deformation, wherein the measurement of the ATD deformation may be performed with the use of optical triangulation techniques. The measurement range of a pair of incident light angle detectors may be defined by an overlapping field of view. Narrow band filters may be used on the light emitter and the plural incident light angle detectors in order to increase the number of measurement points while reducing cross-talk of neighboring measurement systems. The ATD may also feature a controller for adjusting a light intensity of a plurality of light emitters. The controller may multiplex the plurality of light emitters as well as adjust the intensity of each emitter for the various detectors. The controller may also adjust the gain of the detectors.

During the process of collecting data, a measurement may be taken where none of the light emitters are illuminated. This measurement sample may be subtracted from other measurement samples in which the light emitters are illuminated, in order to compensate for ambient light and sensor dark current.

The ATD may also comprise a variable gain device that maintains a near full scale sensor output regardless of a light emitter position. For example, a variable gain transimpedance amplifier may be used with a constant light emitter drive level. The gain of the amplifiers may be adjusted to maximize the signal to noise ratio and prevent saturation as the light emitter moves through the measurement range.

A method of providing an ATD measurement is also discussed. The method comprises steps of providing a light emitter, the light emitter being mounted on an ATD member, the light emitter being driven at varying current levels, receiving light from the light emitter with the use of plural incident light angle detectors, collecting data from the incident light angle detectors, and providing a measurement of ATD member deflection. The method further comprises steps of calculating ATD member deflection with the use of optical triangulation techniques and preventing cross-talk of near-by measurement systems with the use of narrow band color filters.

A method of providing an ATD system is discussed. The method comprises steps of digitizing and storing, in memory, an output of at least one sensor in the ATD, and turning on, sequentially, only one of the plurality of light emitters, and controlling the light emitter brightness level to assure a sufficient light intensity at one of the sensors, while repeating the above step for each sensor and each led for a duration of a test. The method further comprises steps of downloading data samples stored in memory over a communication channel to an external computer, once the test is completed, and storing the data samples in a data file used in a calculation of ATD member deformation with the use of data visualization and analysis programs.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The teachings of all patents, published applications and references cited herein are incorporated by reference in their entirety. Also incorporated by reference in its entirety is U.S. application Ser. No. 11/362,971, filed Feb. 24, 2006.

Optical triangulation techniques are used to monitor three-dimensional position data of multiple points on ATD ribs at high speeds suitable for crash test data. It comprises light emitting diodes (LEDs) placed at the desired measurement points, incident light angle detectors mounted to the thoracic spine, and a master controller placed inside the thoracic spine or a remote location.

Figure 1:
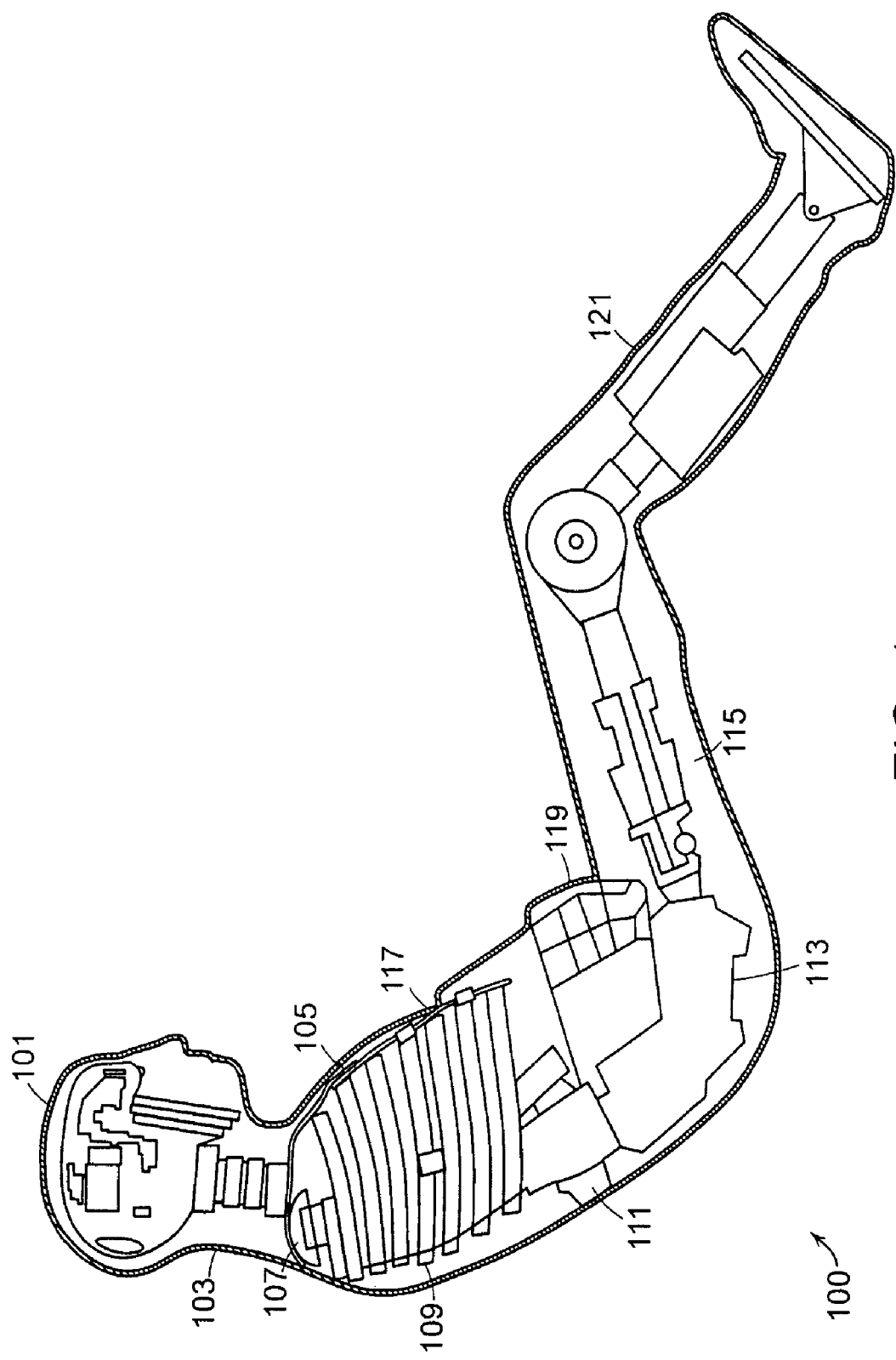
FIG. 1 is a schematic of an ATD, according to the prior art.
Figure 2B:
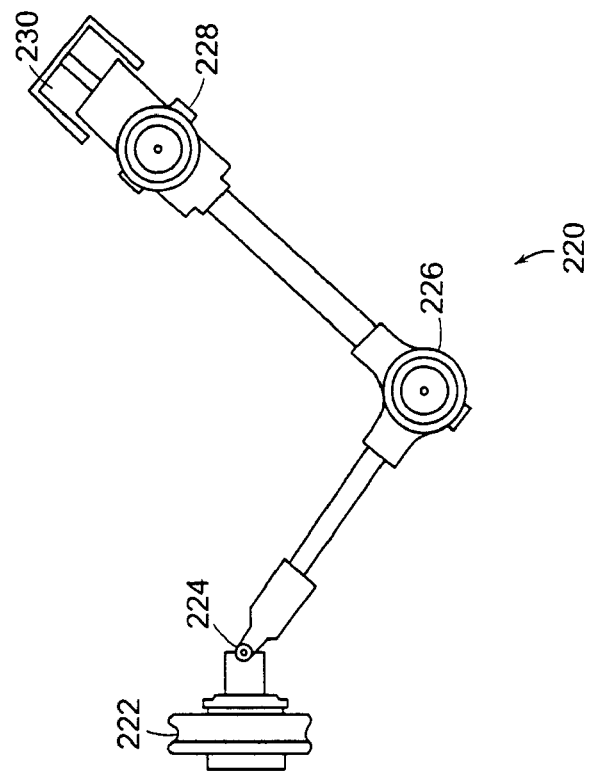
FIG. 2A is a drawing of the torso of an ATD and FIG. 2B is a detailed drawing of an ATD CRUX unit.
Figure 2A:
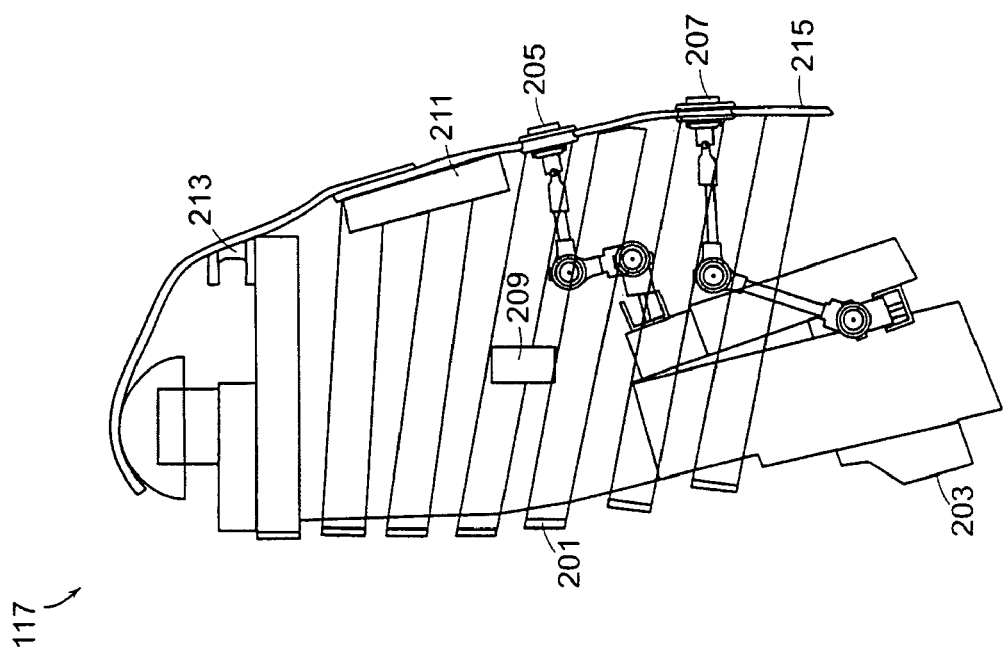
Figure 4:
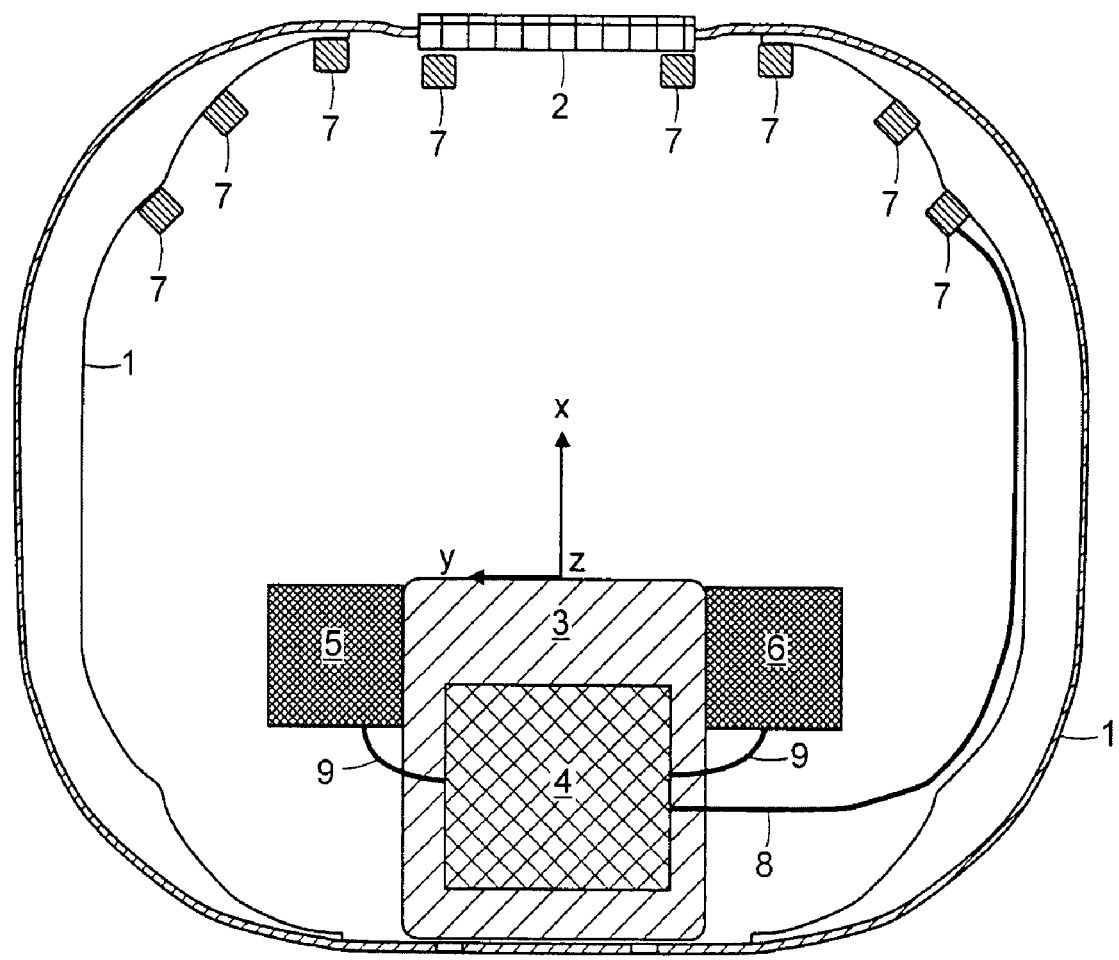
FIG. 4 is a top view schematic depicting the position of the various components of the ATD measurement system.
Figure 5:
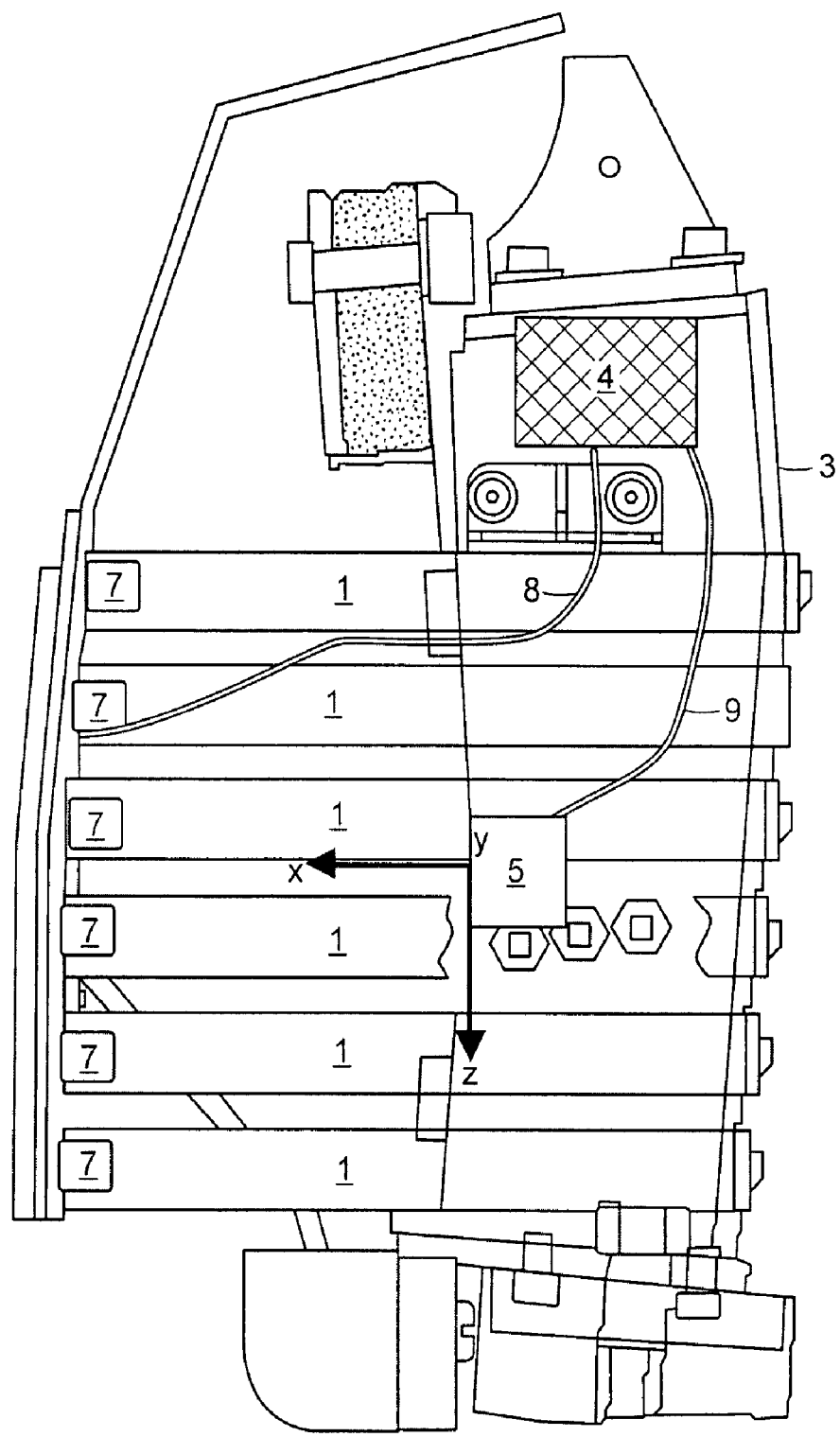
FIG. 5 is a side view diagram depicting the position of the various components of the ATD measurement system.
Figure 10:
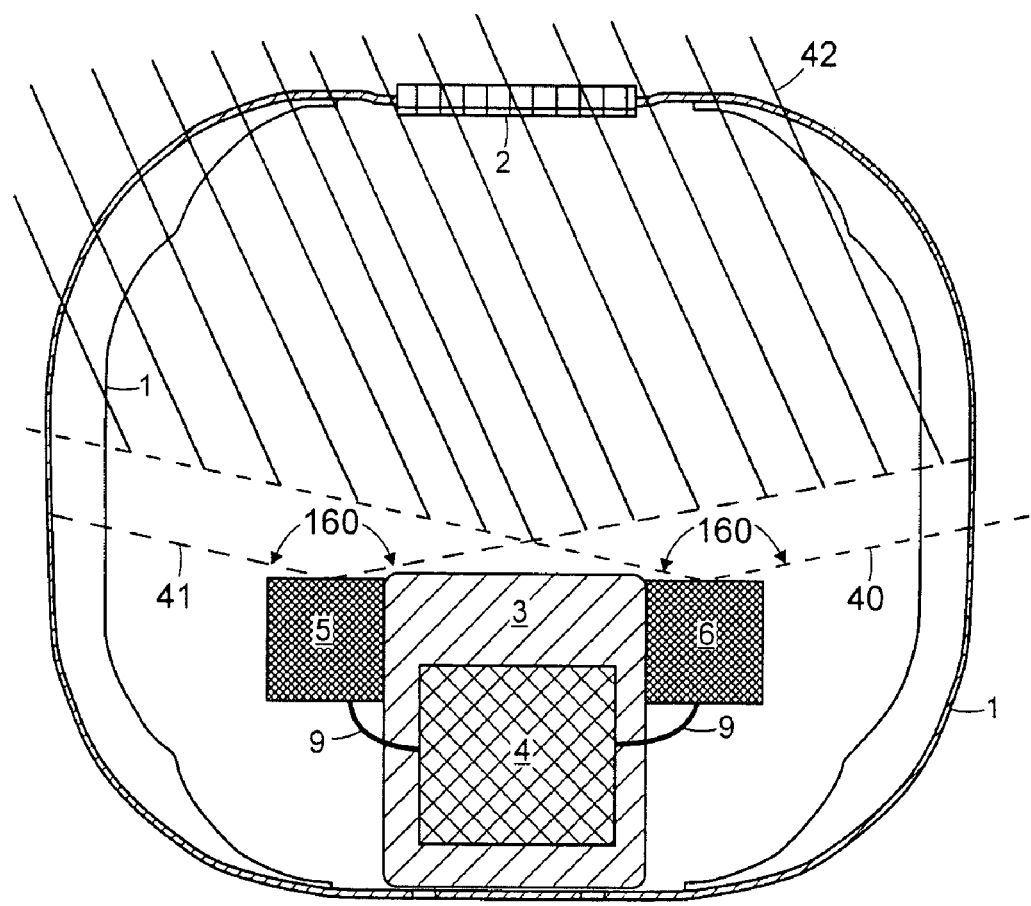
FIG. 10 is a top view schematic depicting the range of measurement of a pair of incident angle detectors.
Figure 11:
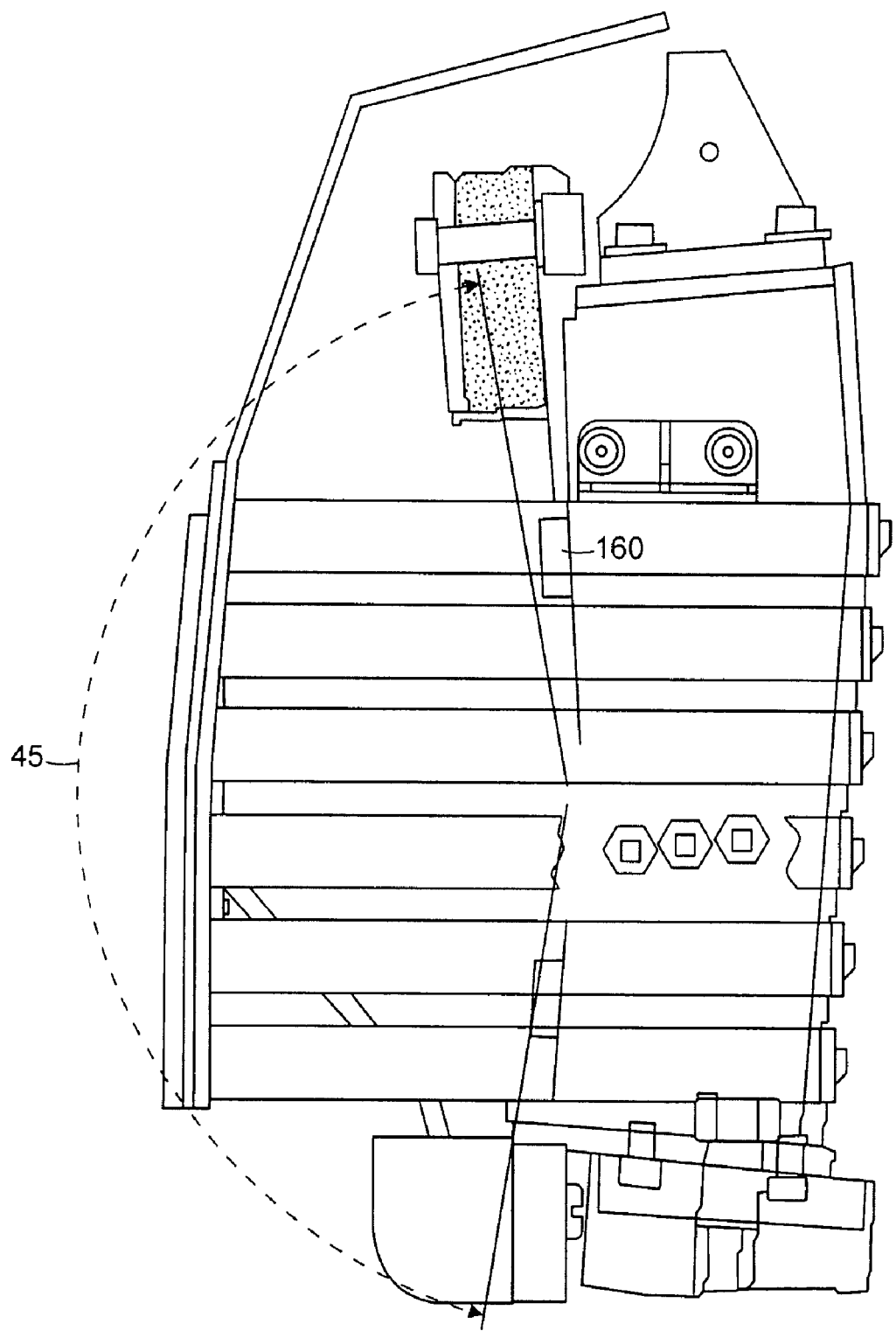
FIG. 11 is a side view diagram depicting the range of measurement.

The general arrangement of these components is shown in top and side views in FIGS. 4 and 5. (FIGS. 4 and 10 are taken from NHTSA Drawing Number 880105-361-xx. part of NHTSA Technical Drawings and Specifications P/N 880105, released Jun. 10, 2002, with overlays, and FIGS. 5 and 11 are taken from the NHTSA reference, with overlays.) The deflection measurement system comprises light emitting diodes 7 which are attached to the ribs 1 or sternum plate 2 at any location desired by the user. LEDs are very low in mass and therefore do not affect the bio-fidelity of the ribs or other components they are attached to. LEDs may be attached using nylon zip-ties or by any other attachment means. Several examples of possible LED locations are shown in FIG. 4. The LEDs are connected via a cable 8 to the controller/Data Acquisition System (DAS) 4 mounted within the thoracic spine assembly 3. Only one cable has been illustrated for clarity, it should be appreciated any number of cables may be implemented. Incident light angle sensors 5 and 6 are mounted on the left and right sides of the thoracic spine assembly to detect light from the various LEDs 7. The incident light angle sensors are connected via cables 9 to the controller/DAS. For typical testing, two LEDs will be mounted on each rib, spaced on either side (left and right) of the sternum plate. A total of 12 LEDs are used. It should be appreciated that multiple LEDs may be mounted on a rib, and/or dispersed among all of the ribs.

The LEDs are turned on one at a time, while two or more incident light angle detectors detect the angle of the LED with respect to the X-Y and X-Z planes. The method of monitoring motion in the X-Y plane will first be explained, and then an explanation of the measurement of LEDs located in the Z plane will follow. The coordinate systems refer to those marked in FIGS. 4 and 5.

Figure 6:
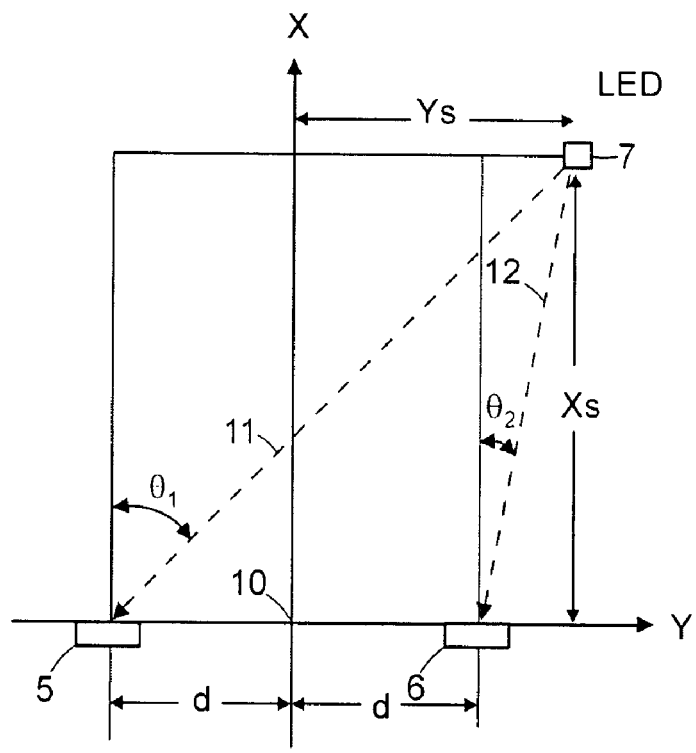
FIG. 6 is a schematic depicting the use of triangulation with incident light angle detectors.

FIG. 6 shows two incident light angle detectors 5 and 6 located a distance d from the origin in the +Y and −Y directions. An LED 7 is located at coordinates $X_S$ and $Y_S$ relative to origin 10. The LED emits light in many directions. Light rays 11 and 12 hit the centers of the incident light angle detectors making angles $\theta_1$ and $\theta_2$ with respect to the primary axis of the incident light angle detectors 5 and 6, in the X-Y plane. By measuring $\theta_1$ and $\theta_2$ we can calculate the tangents of the angles to derive k1 and k2, and therefore calculate the $X_S$ and $Y_S$ positions. The following equations may be used to determine the position of LED 7 in the X and Y coordinate:

$$k_1 = \tan(\theta_1) = \frac{(Y_S + d)}{X_S}$$

$$k_2 = \tan(\theta_2) = \frac{(Y_S - d)}{X_S}$$

$$X_S = \frac{2d}{(k_1 - k_2)}$$

$$Y_S = \frac{d(k_1 + k_2)}{(k_1 - k_2)}$$

The preferred triangulation technique described above is based on the use of a light angle detectors. The triangulation approach might also be based on distance detectors. However, the signal of distance sensors falls off with the inverse of distance squared and such measurements are more sensitive to ambient light levels. A triangulation approach might also be based on plural emitters, at the locations at sensors 5 and 6, and a sensor at each rib location. The triangulation approach, used with wide beams from the LEDs, assures that the beams are detected by the sensors and that measurements are obtained even with a large displacement and/or twisting of the ribs.

Incident light angle detectors may be made using several technologies including position sensitive diodes (PSD), charge coupled devices (CCD), or dual photodiodes, with appropriate optics. PSDs are the preferred detectors since they provide the speed and resolution which are of importance for this application. A PSD is a linear or two-dimensional array of photosensitive material, that provides an output which is a function of the center of gravity of the total light quantity distribution of an its active area. For monitoring the LED position in a single plane, a linear PSD may be used. A linear PSD has two current outputs. When an area of the PSD is illuminated, two currents will be generated. The currents are proportional to the location of the center of gravity of the light spot with respect to the center of the PSD. The position of the center of gravity of the light spot, $Y_M$, can be calculated from the two output currents by:

$$Y_M = \left(\frac{L}{2}\right)\frac{(i_1 - i_2)}{(i_1 + i_2)}$$

Where $Y_M$ is the distance of the center of gravity of the light spot from the center of the PSD, L is the length of the PSD, $i_1$ is the current from terminal 1, and $i_2$ is the current from terminal 2.

Figure 7:
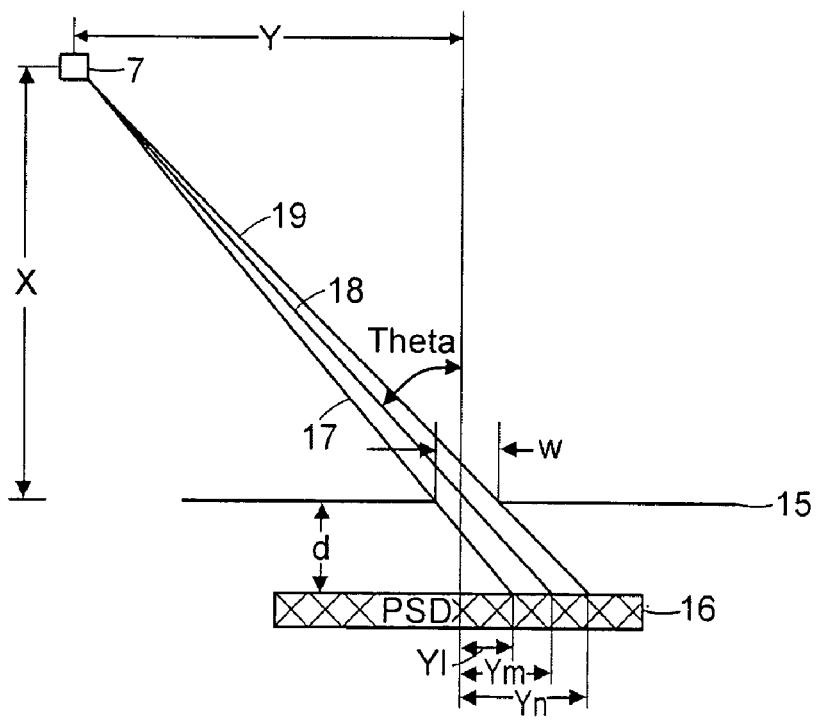
FIG. 7 is a schematic depicting triangulation with PSDs.

FIG. 7 shows a PSD 16 placed a distance d behind a precision slit plate 15 with a slit width w. A LED light source 7 is located at coordinates (X, Y) with respect to the center of the slit. Three light rays are shown, 17, 18, and 19. Ray 17 passes by the left edge of the slit, ray 18 passes through the center of the slit, and ray 19 passes by the right edge of the slit. These rays define the illuminated length of the PSD, from $Y_L$ to $Y_R$. If the rays are of the same intensity, the center of gravity of the illuminated area is given by $Y_M$. The slope of the line hitting the left edge of slit 15 may be given as:

$$m_L = \frac{\Delta Y}{\Delta X} = \frac{\left(Y - \frac{w}{2}\right)}{X}$$

Therefore $Y_L$, the distance from the center of the PSD to the left edge of the illuminated area on the PSD, is given by:

$$Y_L = \frac{d\left(Y - \frac{w}{2}\right)}{X} - \frac{w}{2}$$

Likewise, the slope of the line hitting the right edge of the slit and the distance from the center of the PSD to the right edge of the illuminated area on the PSD may be given by:

$$m_R = \frac{\left(Y + \frac{w}{2}\right)}{X}$$

$$Y_R = \frac{d\left(Y + \frac{w}{2}\right)}{X} + \frac{w}{2}$$

Finally, the center of gravity of the light spot from the center of the PSD may be given by:

$$Y_M = \frac{(Y_L + Y_R)}{2} = \frac{\Delta Y}{X}$$

$$X = r \cos\theta$$

$$Y = r \sin\theta$$

$$Y_M = d\left(\frac{\sin\theta}{\cos\theta}\right) = d \tan\theta$$

It should be appreciated that making the slit width w small assures that the rays from a LED will all be of the same intensity. It should also be appreciated that Ym is proportional to the tangent of the angle $\theta$, and the tangent of $\theta$ is used in the triangulation calculations given in above in the discussion of FIG. 6. The total PSD current is equal to the sum of i1 and i2, which is proportional to the light power incident on the PSD. Although a slit is shown as the optical element in FIG. 7, a cylindrical lens can also be used.

With either a slit or cylindrical lens, the configuration in FIG. 7 provides the incident light angle within the X-Y plane, and is insensitive to the LED orientation in the Z direction (in and out of the page in FIG. 7). The slit or cylindrical lens allows light rays from LEDs displaced in the Z direction for the X-Y plane of the sensor to hit the sensor, allowing the angle of the LED with respect to the X-Y plane to be measured.

Figure 8:
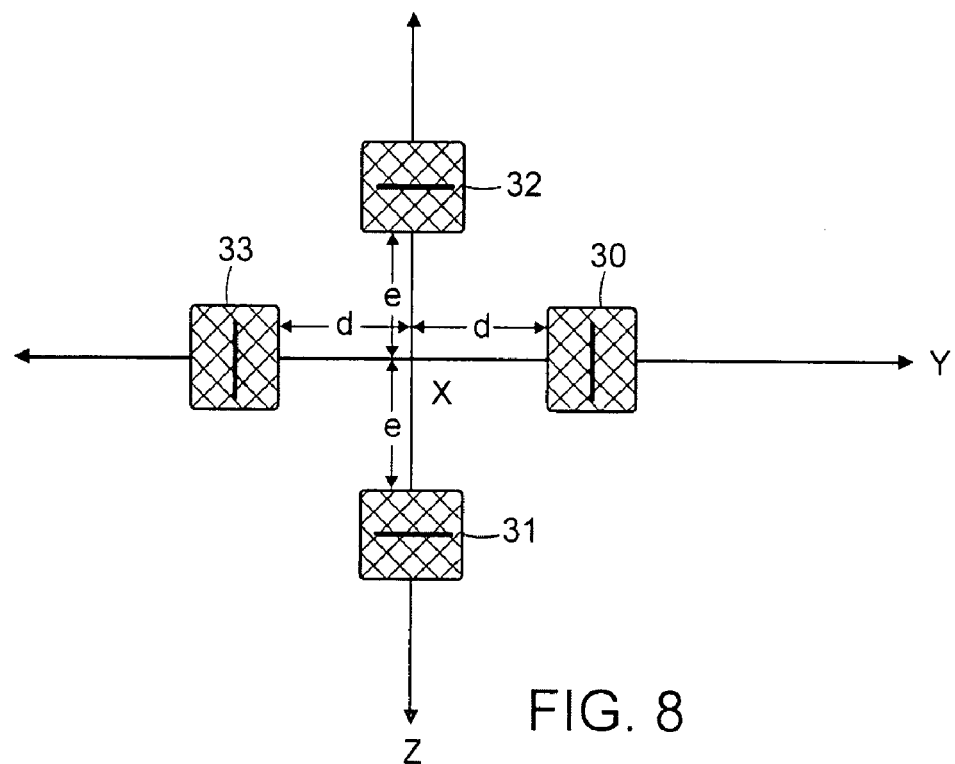
FIG. 8 is a drawing depicting three-dimensional detection with two pairs of sensors.

This concept can be extended to monitoring the three-dimensional position of the LED in several ways. One method of providing a three-dimensional measurement is to add a second pair of sensors aligned to measure the incident light angle with respect to the X-Z plane, as shown in FIG. 8. In FIG. 8, incident angle sensors 30 and 33 are spaced a distance d from the origin along the Y axis. This sensor pair provides the incident light angle with respect to the X-Y plane. A second pair of incident light angle sensors 31 and 32 are displaced a distance e from the origin along the Z axis, and provide the incident light angle with respect to the X-Z plane. Using the same equations as described previously, the LED X and Y positions may be calculated from sensor pair 30, 33. The X and Z positions may be calculated from sensor pair 31,32. This topology has the advantage of providing redundant information for the X coordinate, the most critical dimension in terms of torso injury assessment.

A second approach to getting three-dimensional information is to use an area-type PSD. Area PSDs have four outputs, arranged in two pairs of two. One pair provides displacement data for the Y axis, and the second pair provides data for the Z axis. Instead of a slit or cylindrical lens used in the 2-dimensional case, a pinhole or round lens is used.

Figure 9:
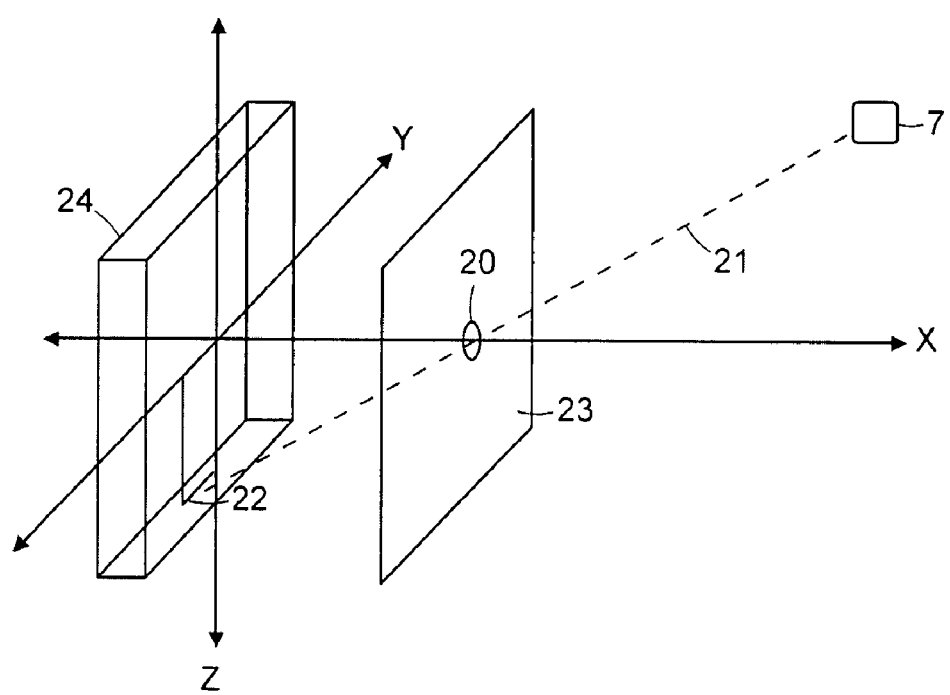
FIG. 9 is a schematic depicting triangulation with an area PSD and pinhole lens.

FIG. 9 shows an area PSD 24 with a plate 23 with a pinhole lens 20 mounted in front of PSD 24. Light rays 21 from the LED 7 pass through the pinhole and illuminate a spot 22 on the area PSD. The Y and Z locations of the center of gravity of the spot are read from the area PSD by monitoring the four current outputs and processing each pair of current outputs in a similar fashion as described above for the two-dimensional case.

The range of measurement for this system, for either the two-dimensional or the three-dimensional case, depends on the field of view of each of the incident light angle sensors. When a pair of sensors is used, the measurement range is defined as where the fields of view of the two sensors overlap. FIG. 10 shows a top view of the ATD chest with a pair of incident light angle sensors 5,6. Each sensor has a 160 degree field of view. The field of view of sensor 5 is shown as dashed lines 41, while the field of view of sensor 6 is shown as dotted line 40. The overlapping range of the two field of views is shown by angled lines 42. In the three-dimension case, the measurement range is defined by a cone with a solid angle equivalent to the field of view of the sensors. FIG. 11 shows the three-dimensional measurement range 45 from a side view of the dummy.

Figure 12:
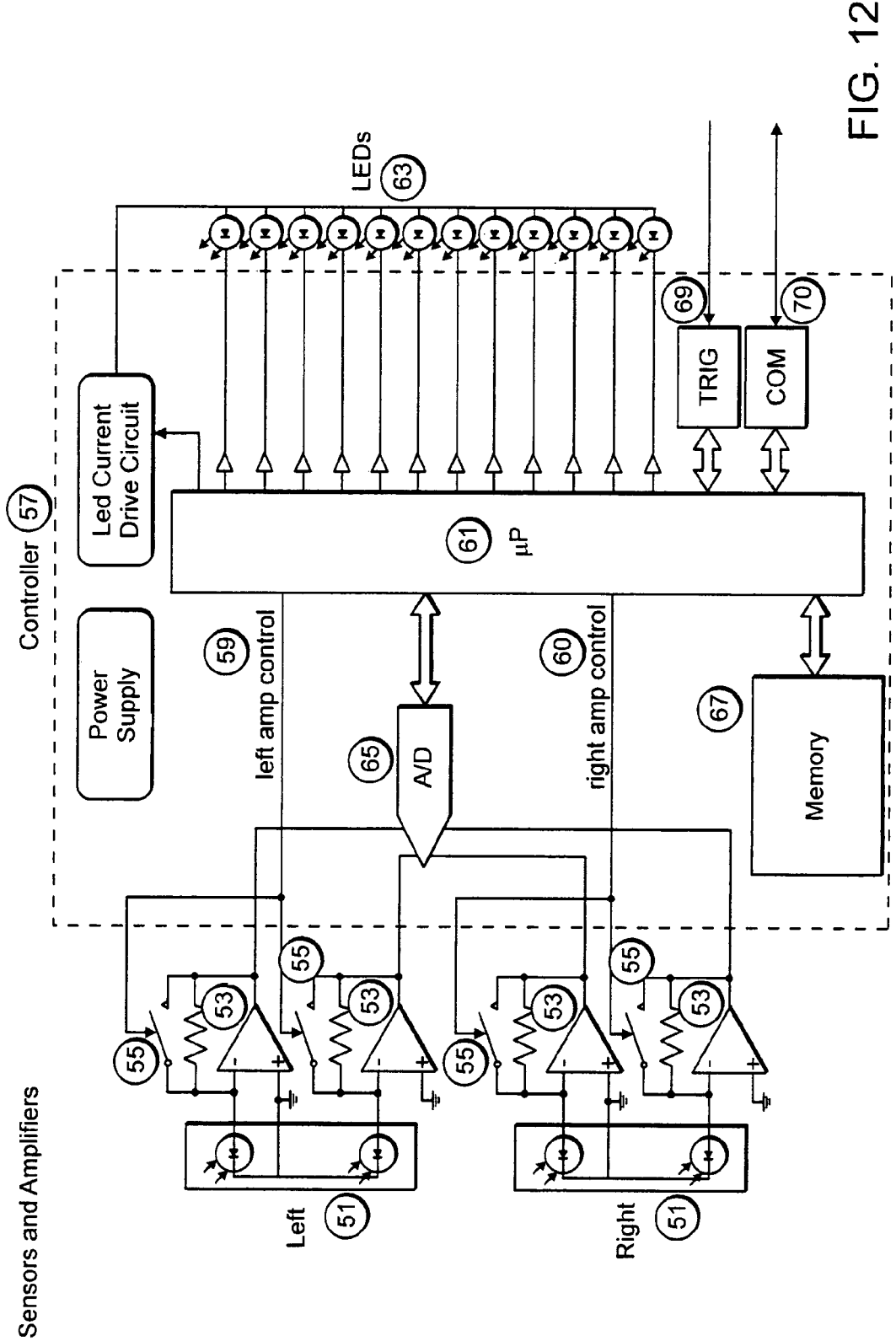
FIG. 12 is a block diagram of the ATD measurement system.
Figure 13:
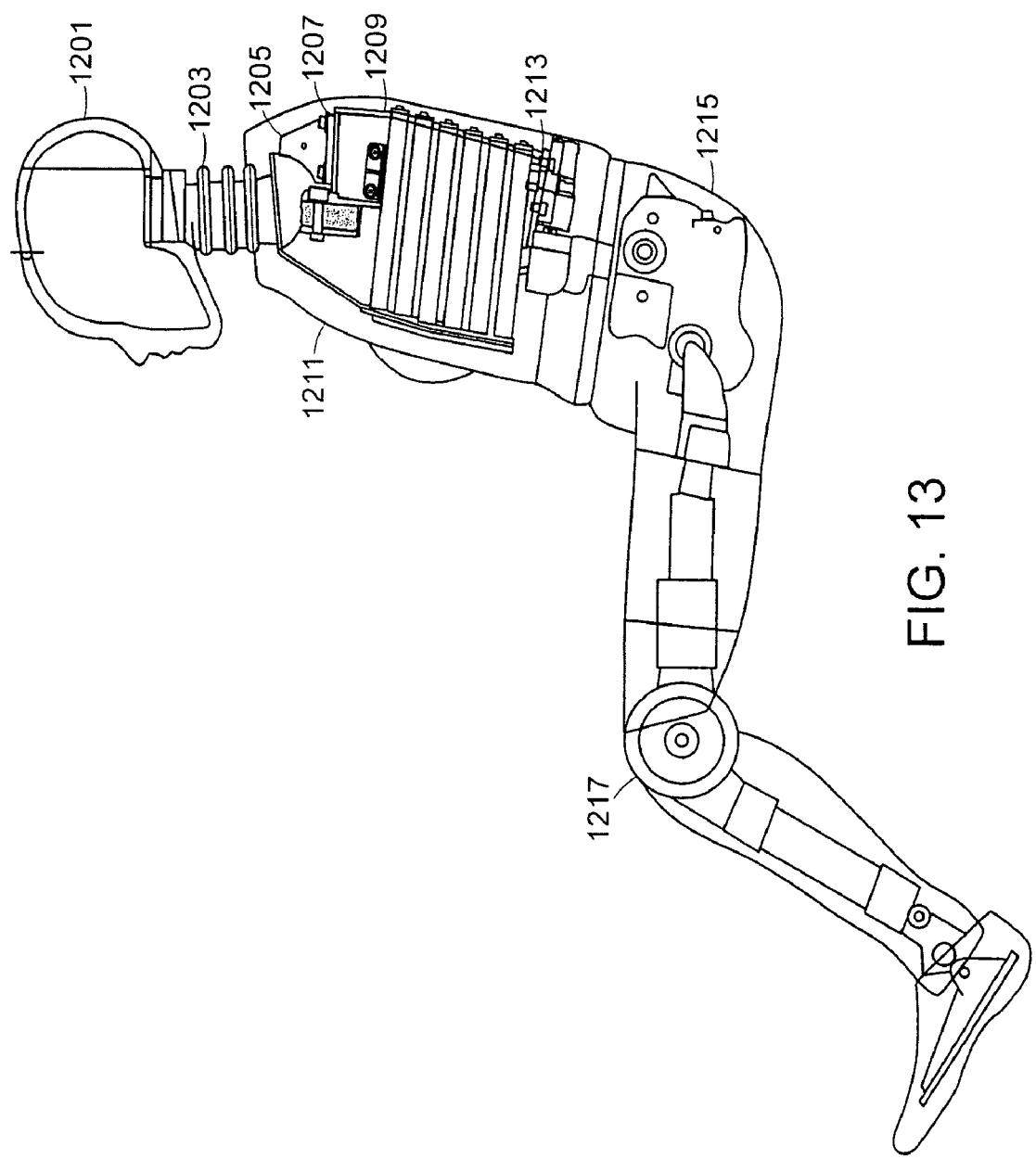
FIG. 13 a schematic of an ATD, according to the prior art.
Figure 14B:
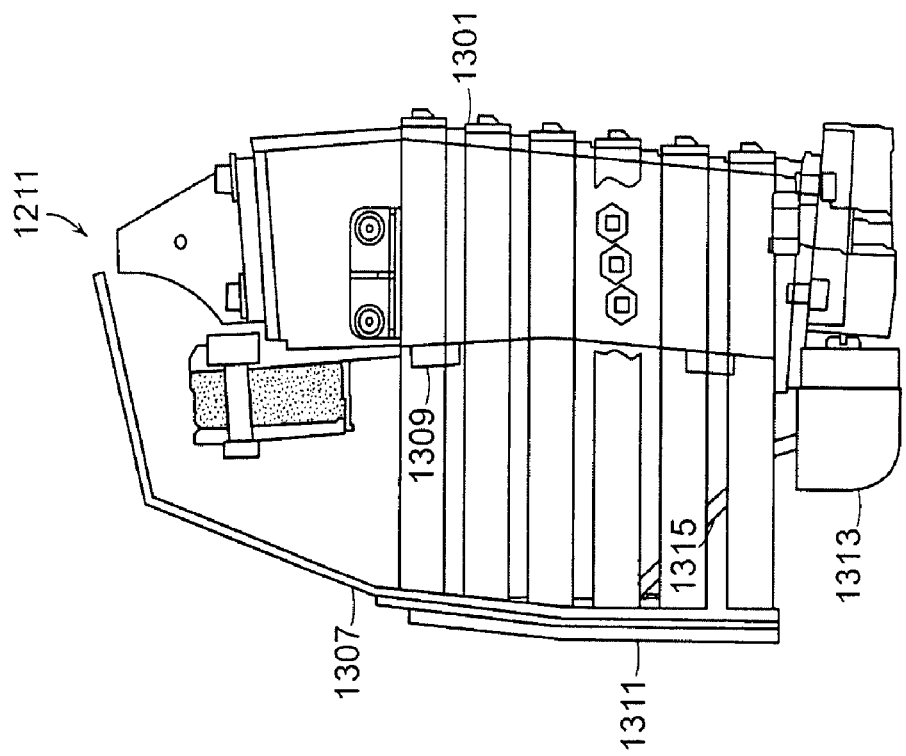
FIGS. 14A and 14B are front and side views, respectively, of the ATD torso assembly featured in FIG. 13.
Figure 14A:
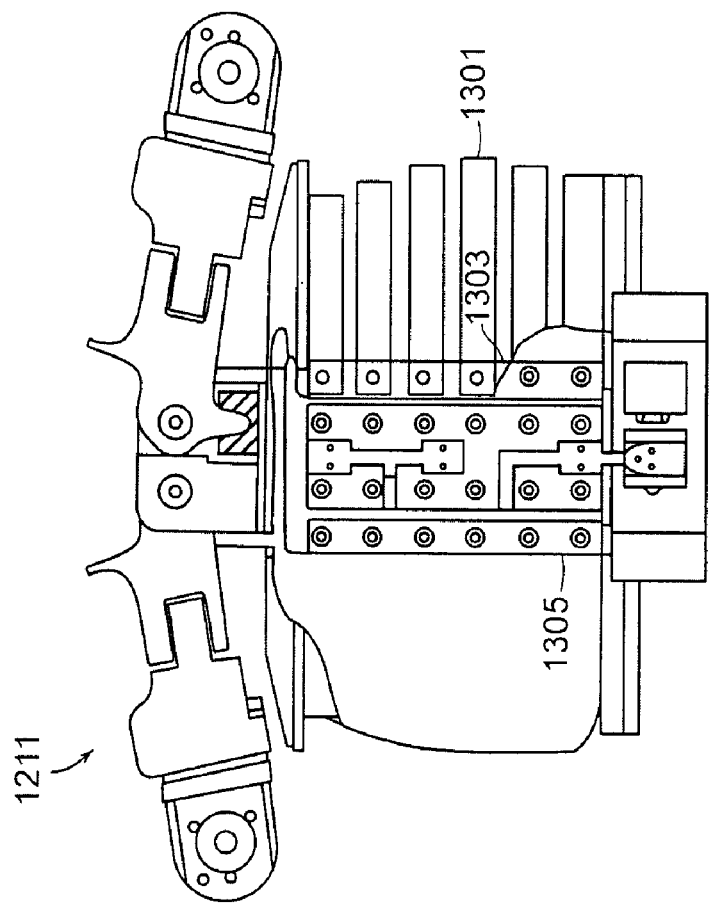
Figure 15:
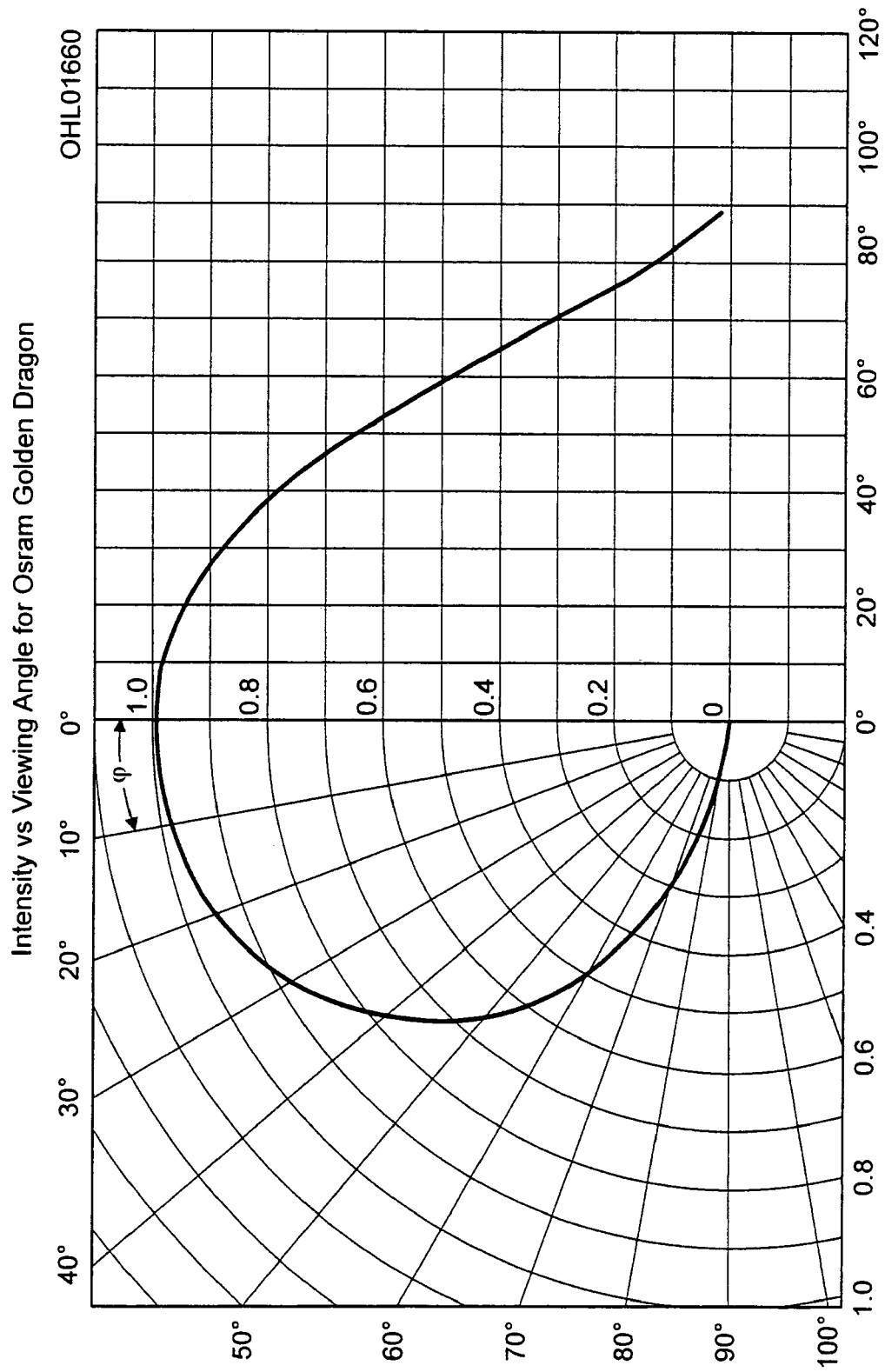
FIG. 15 shows the emission pattern of an Osram Golden Dragon series LED.

FIG. 12 shows a block diagram of the electrical circuitry for the system. Sensors 51 comprise PSDs configured as incident light angle detectors combined with the signal conditioning transimpedance amplifier circuits 53. Each transimpedance amplifier 53 has an analog switch 55 placed across the gain resistor. When an analog switch 55 is closed, the gain of the transimpedance amplifier is significantly reduced. The amplified and conditioned outputs of the sensors are high level signals that are connected via cables to the controller/DAS unit 57. The controller/DAS unit contains a microprocessor 61, memory 67, analog to digital converter 65, an adjustable LED current drive circuit 64, control lines to turn on each of the 12 LED s 63$a$-1, and control lines 59 and 60 to open and close the analog switches 55 on the sensor amplifiers. The controller also includes trigger 69 and communications 70 circuits. The communications circuits 70 may be a simple serial, USB or Ethernet port. Faster communications channels are preferred because of the large volume of data collected during a crash test.

The trigger circuit 69 may provide an external signal used to mark the beginning of the event, or "Time-Zero" in industry terms. When the system is armed by the user via external command, it begins collecting data to a circular buffer in memory. When a Time-Zero signal is received it marks the current location in memory, and continues to record data for the remainder of the pre-defined test time. When the data is downloaded and processed by the external computer, each data sample is time stamped relative to Time-Zero. This allows the data to be compared with data from other measurement systems.

The microprocessor 61 can turn on one of the 12 LEDs 63$a$-1 at a time, and set the amount of current flowing through the LED by means of the LED current drive circuit 64. This allows the microprocessor to adjust a LED brightness so that either the left or right sensor receives sufficient light intensity for a near full scale output on the largest of the two outputs from a sensor.

Figure 16:
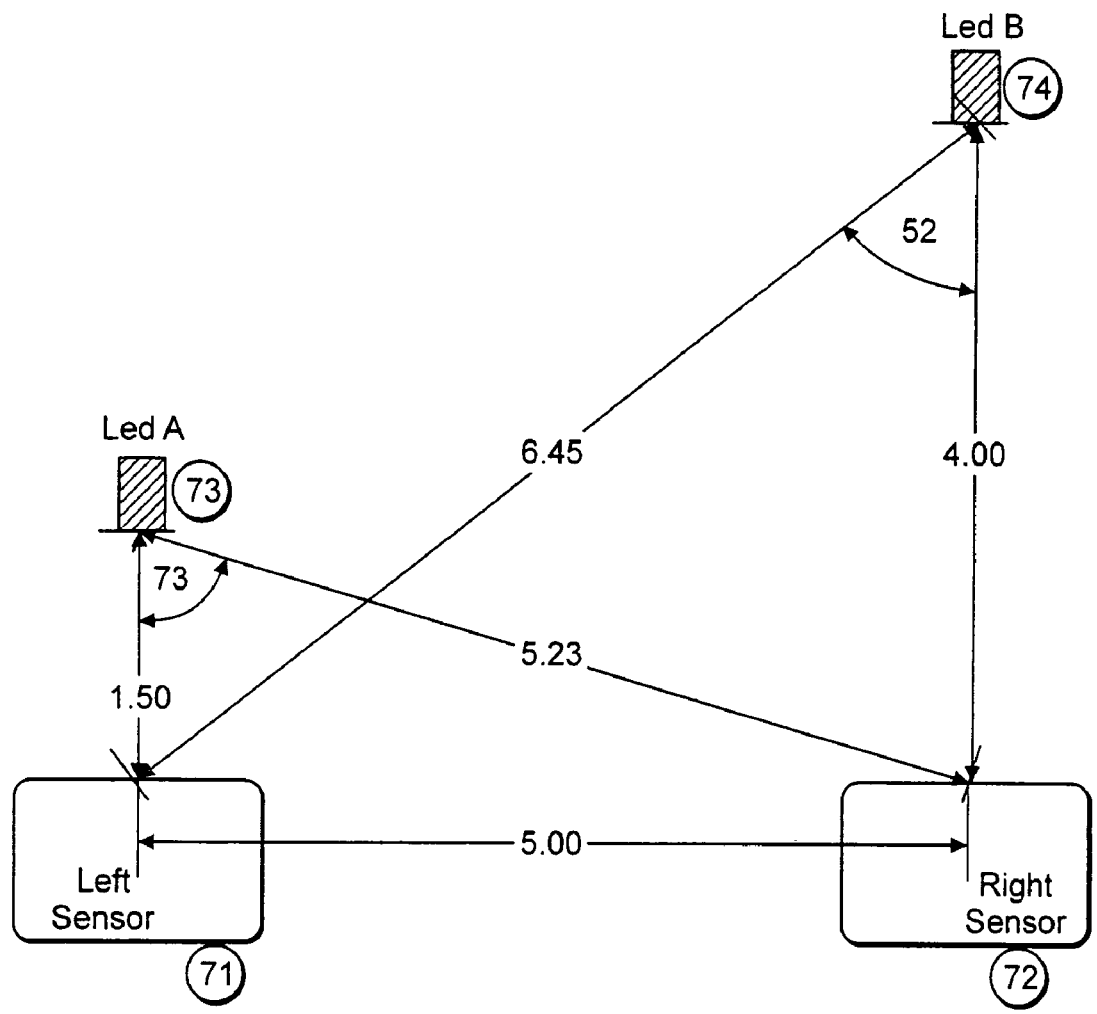
FIG. 16 shows two sensor heads and two LEDs in representative positions within the measurement range of a Hybrid III $5^{th}$ female dummy.

Referring to FIG. 16, when a led is turned on and in the position of LED A 73, and the microprocessor has adjusted the LED current for a near full scale output on the right sensor 72, the amplifiers for left sensor 71 would be driven into saturation. If an amplifier saturates it can take hundreds of microseconds to come out of saturation when the light signal is removed. To prevent the left sensor amplifiers from saturating, the analog switches 55 on the left sensor amplifiers are closed, which significantly reduces the amplifier gain. If an amplifier saturated, data would be lost until it recovered.

The combination of the ability to adjust the current drive of each LED, and hence its brightness along with the capability of the analog switches to prevent amplifier saturation, allows near full scale readings from each sensor for each LED, independent of the position or angular orientation of the LED. By maximizing the outputs of the sensors, the signal to noise ratio or the measurement is maximized, yielding maximum accuracy of the LED position calculations.

The microprocessor can also read the outputs of the sensors when none of the LED s are turned on, this is the "no-light" case. During the "no-light" case the sensor outputs measure the ambient light and the dark current of the PSD sensor itself. These readings can be stored and later subtracted from readings taken when a LED is turned on to eliminate the effects of ambient light and the sensor dark current.

For crash testing applications, data is typically acquired for each LED 10,000 times per second, or 100 microseconds sample period. If 12 LED positions are to be monitored, each LED will be turned on once for each sensor. Each sensor will also be read once each sample period with no LEDs turned on to measure the ambient light. Therefore, we divide each 100 microsecond sample period into 26 even increments ((12 LEDs+1 "no-light")×2 sensors=26). Thus, for a 100 microsecond sample period, each LED will be turned on once for 3.8 microseconds at a current level appropriate for the left sensor, and turned on again for 3.8 microseconds at a current level appropriate for the right sensor.

LED brightness is almost directly proportional to the LED current. LED brightness specifications and maximum current drive levels are given for continuous operation. By only turning on the LEDs for 3.8 microseconds out of every 50 microseconds, they are operating at a 7.6% duty cycle. This allows the LEDs to be driven at over 5 times the rated current levels, yielding a maximum brightness over 5 times rated brightness.

Figure 17:
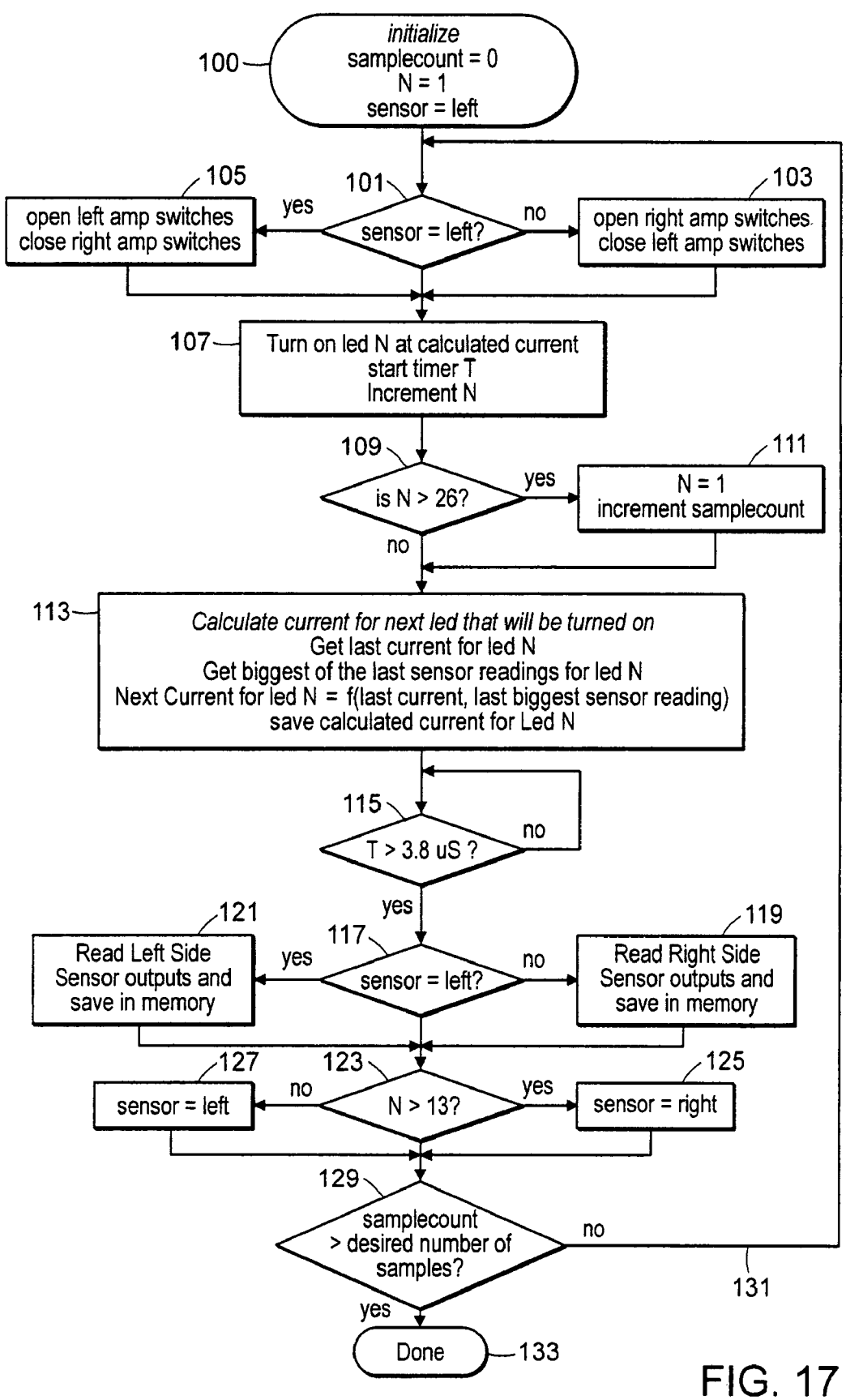
FIG. 17 is a flowchart of the data acquisition process.

The microprocessor 61 and its firmware control the recording process. An operational example of the microprocessor 61 for a system comprising 12 LEDs [N=(12 LEDs+1 "no-light")×2 sensors=26] is shown in FIG. 17. First the microprocessor 61 initializes 100 the measurement parameters, for example setting the sample-count, or number of samples measured thus far, to zero; setting the LED number to 1, or initializing the measurements to begin with the first LED (note: each LED will be measured twice, therefore the first LED with correspond to N=1 and N=14, the no-light samples will correspond to N=13 and N=26); and setting a default sensor (i.e. sensor=left sensor). The microprocessor 61 will first record the measurements of each individual LED with the left sensor, once all of the LEDs have been measured with the left sensor, the microprocessor 61 will then switch the default sensor to the right sensor and measure all the individual LEDs with the right sensor.

A checking step 101 is performed by the microprocessor 61 to determine if the sensor setting is correct. If data from the left sensor is to be measured, the left amplifier control 59 is set so the left amplifier switches are open and the right amplifier control 60 is set so the right amplifier switches are closed 105. Similarly, if data from the right sensor is to be measured, the left amplifier control 59 is set so the left amplifier switches are closed and the right amplifier control 60 is set so the right amplifier switches are open 103.

Next, an LED is individually turned on and a timer is started 107. If N=1 or N=14, LED 63$a$ is turned on at a current level calculated for it, and a timer is started. Once the LED has been turned on, the LED number N is also incremented 107. Next, the LED number N is checked to see if N has reached its maximum value, in this example 26 109. N reaches its maximum value once all of the LEDs in the system have been tested, therefore if the maximum value is reached N is set back to 1 and the sample-count number is incremented 111.

While waiting for the sensor output to stabilize the microprocessor 61 calculates the appropriate current level for the next LED to be turned on, based on that LED's last current setting and the biggest of the two sensor outputs recorded from the previous sample 113. When the timer reaches a trigger time 115, for example 3.8 microseconds, the microprocessor will trigger the A/D 65 to read and store the selected sensor outputs 117-121.

This process is repeated until all LEDs 63$a$-1 have been energized and the left sensor readings recorded. Next the microprocessor will take one reading of the left sensor with no LEDs (N=13 or N=26) energized and store it in memory. This provides a measure of the ambient light. The controller then sets the left amplifier control so that the left switches are closed and the right amplifier control so that the right amplifier switches are open and repeats the above process while storing the digitized right sensor data 123-127. The process is repeated continuously until the test is completed 129-133.

After the test is completed, all of the data samples stored in memory are processed to convert raw sensor readings to LED positions in engineering units as follows: The no-light readings are subtracted from each data sample to eliminate the effects of ambient light. Next for each led, the position of the light spot on the PSD is calculated using the formulas given above for the PSDs. Calibration tables are used to convert the position of the light spot on each PSD to an angle. Calibration tables are required to accommodate the non-linearities in the optics and the signal processing path. Finally, the triangulation equations given above are use to calculate the led positions based on the angles.

During a typical vehicle crash test, 100 milliseconds of data is recorded pre-Time-Zero, and 900 milliseconds of data is recorded post-Time-Zero. The controller/DAS will have the capability to stream data over the communications channel when it is not collecting data at high speeds during a test. This data can be displayed by the external computer to verify that the LEDs are in the desired positions specified by the test requestor, the dummy ribs have not been deformed on a previous test, and they still meet the government mandated pre-test geometry, and the system is performing properly.

Figure 18:
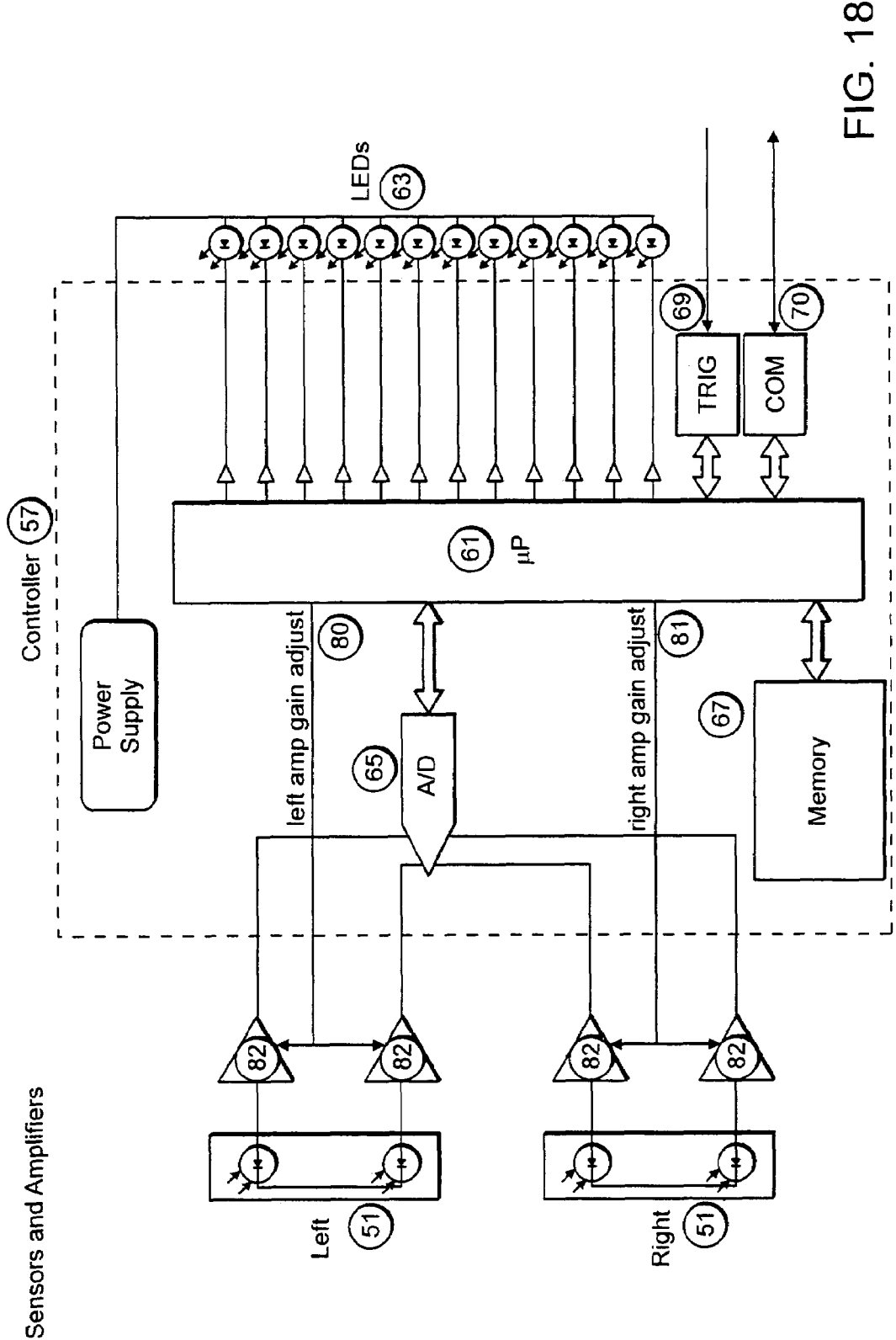
FIG. 18 is a block diagram of the system using adjustable gain amplifiers.

FIG. 18 shows an alternative approach to the measurement system. In this approach, the transimpedance amplifiers 82 have a variable gain that is controlled by outputs from the microprocessor 61; the left amp gain adjust signal 80 and the right amp gain adjust signal 81. In this approach, the LEDs are driven at a constant brightness, and the transimpedance amplifiers' 82 gain are varied to achieve a near full scale output of the sensor/amplifier circuit, independent of the LED position. As the LED moves closer to a sensor, the gain of the sensor's amplifier is reduced to prevent the amplifier from saturating. As the LED moves away from a sensor the gain is increased to provide a near full scale output of the sensor/amplifier circuit, maximizing the signal to noise ratio and the measurement accuracy. The variable gain amplifiers can be implemented with a variety of standard techniques, including the use of programmable gain amplifiers or following a fixed gain amplifier with an analog multiplier. Whatever technique is chosen, an important factor to consider is that the gains of the two amplifiers used for each sensor be tightly matched to prevent inducing measurement errors.

The discussions above have been focused on frontal impact dummies, but the same system can be used for side impact dummies as well. For side impact dummies, safety engineers have stated that they would like to record as many as 12 measurement points from each rib, or a total of 72 measurement points from the ribcage. Due to frequency response limitations of the PSD sensors, and the need to acquire data from each LED at a 10 kHz sample rate, a single system will not be able to monitor very many more than 12 LEDs. In this case multiple measurement systems can be used.

However, to prevent the light for a LED being driven by one measurement system from affecting the adjacent measurement system, narrow band color filters can be placed over the LEDs and sensors, with different color filters used for adjacent systems. For example, the top rib system may be limited to infrared light, the next rib system could use blue light, and the next could use red light, etc. This light wavelength modulation technique will allow multiple systems to be mounted near each other without any cross-talk between systems. Thus the number of measurement points may be greatly increased.

While this invention has been particularly shown and described with references to preferred embodiments thereof, it will be understood by those skilled in the art that various changes in form and details may be made therein without departing from the scope of the invention encompassed by the appended claims.

What is claimed is:

1. An anthropomorphic test device (ATD) comprising:
a light emitter, said light emitter being mounted on an ATD member;
a controller adjusting an on-state light intensity of the light emitter; and
a plurality of incident light angle detectors that receive light from the light emitter.

2. The anthropomorphic test device of claim 1, wherein data collected from the incident light angle detectors provides a measurement of ATD member deformation.

3. The anthropomorphic test device of claim 1, wherein the measurement of the ATD deformation is performed with the use of optical triangulation techniques.

4. The anthropomorphic test device of claim 3, wherein the ATD member is a rib or sternum.

5. The anthropomorphic test device of claim 1, wherein a measurement range of a pair of incident light angle detectors is defined by an overlapping field of view.

6. The anthropomorphic test device of claim 1, wherein no mechanical connections exist between the light emitter and the plural incident light angle detectors other than through the ATD member.

7. The anthropomorphic test device of claim 1, wherein the light emitter and the plural incident light angle detectors comprise narrow band color filters.

8. The anthropomorphic test device of claim 1, wherein the light emitter is a plurality of light emitters, the controller multiplexing the plurality of light emitters and adjusting the intensity of each emitter for each detector.

9. The anthropomorphic test device of claim 8, wherein while the controller adjusts the light intensity of each emitter for a detector, the controller also lowers the gain of remaining detectors of the plurality of detectors.

10. The anthropomorphic test device of claim 1, wherein a reading of the plurality of detectors is taken every sample period when the light emitter is not illuminated, and the reading is then subtracted from other readings where the light emitter is illuminated for a same sample period.

11. An anthropomorphic test device (ATD) comprising:
a light emitter;
a plurality of incident light detectors that receive light from the light emitter;
a controller adjusting an on-state light intensity of the light emitter; and
a variable gain device that maintains a near full scale sensor output regardless of a light emitter position.

12. The anthropomorphic test device of claim 11, wherein the incident light detectors are angle detectors.

13. The anthropomorphic test device of claim 11, wherein data collected from the incident light detectors provides a measurement of ATD member deformation.

14. The anthropomorphic test device of claim 11, wherein the measurement of the ATD deformation is performed with the use of optical triangulation techniques.

15. The anthropomorphic test device of claim 14, wherein the ATD member is a rib or sternum.

16. The anthropomorphic test device of claim 11, wherein the light emitter and the plural incident light detectors comprise narrow band color filters.

17. The anthropomorphic test device of claim 11, wherein the light emitter is a plurality of light emitters, the plurality of light emitters being multiplexed.

18. The anthropomorphic test device of claim 11, wherein a reading of the plurality of detectors is taken when the light emitter is not illuminated, the reading is then subtracted from other readings where the light emitter is illuminated.

19. A method of providing an anthropomorphic test device (ATD) measurement comprising steps of:
providing a light emitter, said light emitter being mounted on an ATD member;
controlling an on-state of light intensity of the light emitter;
receiving light from the light emitter with the use of a plurality incident light angle detectors;
collecting data from the incident light angle detectors; and
providing a measurement of ATD member deflection.

20. The method of claim 19, wherein the step of providing the measurement of the ATD member deflection further comprises:
calculating ATD member deflection with the use of optical triangulation techniques.

21. The method of claim 19, wherein the ATD member is a rib or sternum.

22. The method of claim 19, wherein no mechanical connections exist between the light emitter and the plural incident light angle detectors other than through the ATD member.

23. The method of claim 19, further comprising a step of:
preventing cross-talk of near-by measurement systems with the use of narrow band color filters.

24. The method of claim 19, wherein controlling a light intensity of the light emitter further comprises:
adjusting the light intensity of the emitter for a detector of the plurality of incident light angle detectors while lowering a gain of remaining incident light angle detectors.

25. The method of claim 19, wherein the collecting data from the incident light angle detectors is done when the emitter not illuminated, and the data is then subtracted from other data taken when the light emitter is illuminated.

26. A method of providing an anthropomorphic test device (ATD), said ATD comprising a plurality of light emitters and at least one sensor mounted on an ATD member, the method comprising steps of:
digitizing and storing, in memory, an output of the at least one sensor in the ATD;
turning on, sequentially, only one of the plurality of light emitters; and
controlling a gain of a variable gain device that maintains a near full scale sensor output regardless of a light emitter position, while repeating the above step for a duration of a test.

27. The method of claim 26, further comprising the steps of:
processing data samples stored in memory to convert raw sensor readings to LED positions in engineering units;
transferring the data over a communication channel to an external computer, once the test is completed; and
storing the data samples in a data file used with data visualization and analysis programs.

28. The method of claim 26, wherein the output is a measure of a deflection of the ATD member, obtained with the use of optical triangulation techniques.

29. The method of claim 28, wherein the ATD member is a rib or sternum.

30. The method of claim 26, further comprising a step of:
preventing cross-talk of near-by measurement systems with the use of narrow band color filters.

31. The method of claim 26 wherein at least one sensor output is obtained when all of the emitters are not illuminated, and the output is then subtracted from other output taken when at least a portion of the emitters are illuminated.

32. An anthropomorphic test device (ATD) comprising:
lighting means for providing a light emitter, said light emitter being mounted on an ATD member;
receiving means for receiving light from the light emitter;
controlling means for controlling an on-state light intensity of the light emitter and/or a gain of a variable gain device;
collecting means for collecting data from plural incident light angle detectors; and
measurement means for proving a measurement of ATD member deflection.

33. The anthropomorphic test device of claim 32 further comprising:
filtering means for preventing cross-talk of near-by measurement systems.

* * * * *